Patented Apr. 16, 1940

2,196,979

UNITED STATES PATENT OFFICE 2,196,979

APPARATUS FOR POWER GENERATION

Donald J. Campbell, Muskegon Heights, Mich., assignor of one-half to James F. Campbell, Muskegon, Mich., and one-fourth to Islay Investment, Incorporated, Muskegon, Mich.

Application May 9, 1936, Serial No. 78,780

1 Claim. (Cl. 60—14)

My invention relates to improvements in process of power generation and has for one object to combine in one unit an internal combustion engine and a steam engine wherein the waste heat of the internal combustion engine will be utilized most efficiently to generate steam which will be used in some of the engine cylinders to generate power in consonance with the power generation resulting from the combustion of the explosive charge in the internal combustion cylinders.

It is of the utmost importance in accomplishing this that the heat abstracted from the internal combustion part of the system to generate steam be not abstracted in such a way as to seriously, if at all, interfere with the efficiency of the internal combustion engine. Hence, it is important to specially control the rate and place of heat transfer and I propose to do this by bringing the fluid to be vaporized in a liquid condition into contact with the cooler parts of the internal combustion engine and as the temperature of the liquid is raised, bringing it progressively into contact with hotter parts of the internal combustion engine system so that at those points where it will be deleterious to the operation of the internal combustion engine to have excessive cooling, the fluid to be vaporized will have reached a temperature such that it will not excessively cool the internal combustion engine.

Specially, I propose to bring the cold liquid into contact with the lower parts of the internal combustion engine cylinders in a preheating chamber which forms a part of the engine cooling system. Then the slightly heated liquid will be conducted into a cooling chamber associated with an intermediate part of the internal combustion engine cylinder where it will be further heated, the heat at the intermediate part of the cylinder being higher than at the lower part. The next step is to bring the liquid into contact with the cylinder head where materially higher temperatures are available. As a result of this, vaporization will be accomplished, the wet steam or vapor will then be circulated through the system in direct contact with the incandescent gases partially in the combustion chamber itself and partially in the exhaust stream. The resulting superheated steam will be introduced into a steam cylinder.

This progressive heating of the steam source is of the utmost importance and it is necessary that this heating be controlled in various zones so as to provide a satisfactory correlation between the operation of the combustion engine and the expanding steam or vapor engine elements.

Figure 1:
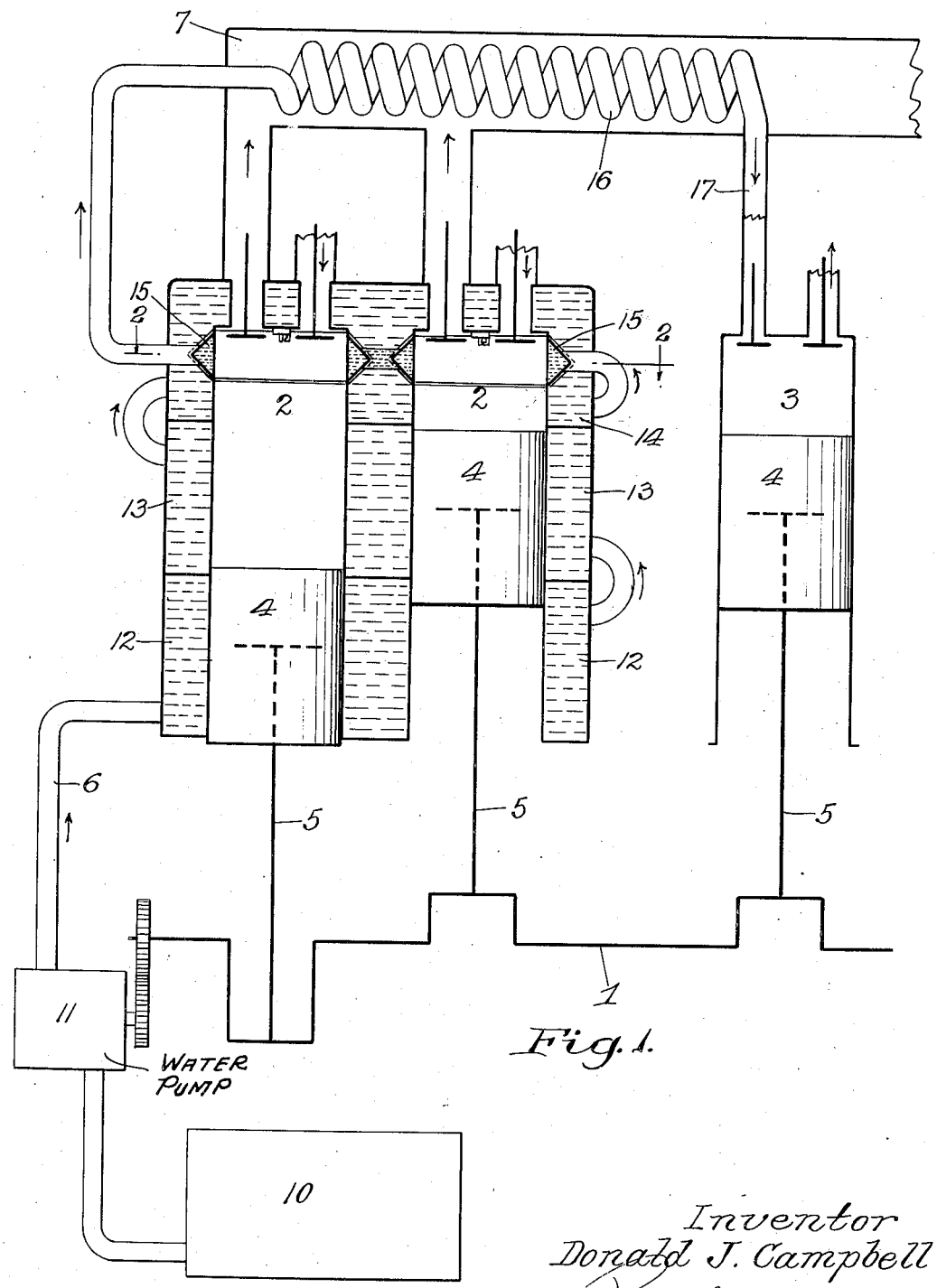
Figure 2:
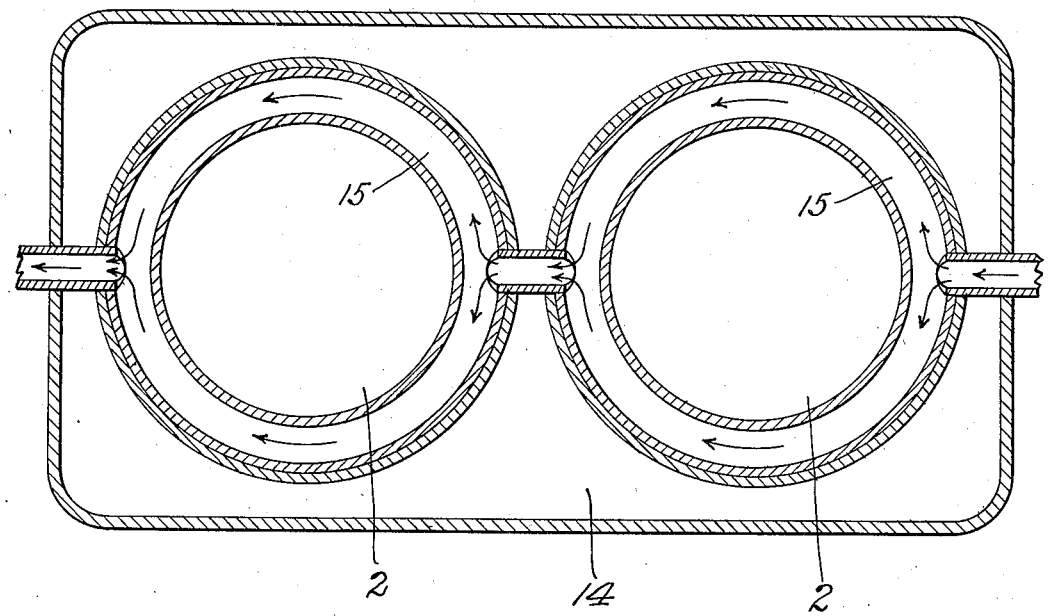

Figure 1 is a diagrammatic sectional view;
Figure 2 is a diagrammatic sectional view on a larger scale along the line 2—2 of Figure 1.

The invention is illustrated more or less diagrammatically in the accompanying drawings wherein 1 is an engine crank shaft. 2 indicates internal combustion engine cylinders. 3 indicates a steam engine cylinders, the engines all having trunk pistons 4 and connecting rods 5, associated with the crank shaft. 7 indicates the exhaust manifold, which receives the discharged or spent gases from the internal combustion engine cylinder.

10 is a water supply, and 11 a pump adapted to force water through the passage 6 into the preheating chamber 12 associated with the lower ends of the internal combustion cylinders. 13 is an intermediate heating chamber encircling the walls of the internal combustion engine cylinders and in communication at the end further separated from the fluid supply with the preheating chamber. 14 is the vaporizing chamber. It encircles and is in intimate contact with the cylinder heads of the internal combustion engine and there the water or other suitable liquid which has been heated in the preheating chamber 12 and further heated in the intermediate chamber is circulated and vaporized, the high heat available at the upper end of the internal combustion engine cylinder accomplishing this. 15 is a coil inside the combustion engine cylinder in communication with the vaporizing chamber at one end and at the other end in connection with a superheating coil 16 on the exhaust manifold, thence the steam now superheated is conducted through the pipe 17 to the steam engine cylinder.

The flow of combustible motive fluid exhaust gas and steam are all controlled by the valves diagrammatically shown. Their details of design and construction are not illustrated as forming no part of the present invention.

I claim:

A power generating apparatus including a plurality of internal combustion engine cylinders and a steam engine cylinder, a cooling jacket surrounding the internal combustion cylinders, an exhaust manifold, communications between it and each internal combustion cylinder, intake and exhaust valves for all cylinders, a piston in each cylinder, a crank shaft, connecting rods interposed between it and each piston, the water jacket being divided into a plurality of separate chambers one adjacent the crank ends, one adjacent the intermediate ends, and one encircling the head ends of the cylinders, conduits joining the adjacent chambers in the order named, a generating coil within the internal combustion cylinders, a superheating coil in the exhaust manifold, a connection between one end of the generating coil and the chamber encircling the head ends of the cylinders, and a connection between the other end of the generating coil and one end of the superheater coil, a connection between the other end of the superheater coil and the steam cylinder, means driven by the engine for forcing vaporizable liquid into the chamber adjacent the crank ends of the cylinders whereby a continuous flow of fluid takes place from the coldest to the hottest part of the internal combustion engine and thence to the steam engine.

DONALD J. CAMPBELL.